United States Patent
Shalunov et al.

(10) Patent No.: US 9,049,537 B2
(45) Date of Patent: Jun. 2, 2015

(54) DISCOVERING AND CONNECTING WIRELESS DEVICES WITHOUT DISCOVERABILITY

(71) Applicants: Stanislav Shalunov, Lafayette, CA (US); Gregory Hazel, San Francisco, CA (US); Micha Benoliel, San Francisco, CA (US)

(72) Inventors: Stanislav Shalunov, Lafayette, CA (US); Gregory Hazel, San Francisco, CA (US); Micha Benoliel, San Francisco, CA (US)

(73) Assignee: OPEN GARDEN INC., San Francisco, CA (US)

( * ) Notice: Subject to any disclaimer, the term of this patent is extended or adjusted under 35 U.S.C. 154(b) by 283 days.

(21) Appl. No.: 13/646,617

(22) Filed: Oct. 5, 2012

(65) Prior Publication Data
US 2013/0091288 A1    Apr. 11, 2013

Related U.S. Application Data

(60) Provisional application No. 61/544,231, filed on Oct. 6, 2011.

(51) Int. Cl.
| | |
|---|---|
| G06F 15/16 | (2006.01) |
| H04W 8/00 | (2009.01) |
| H04L 12/24 | (2006.01) |
| H04L 29/06 | (2006.01) |

(52) U.S. Cl.
CPC ............ *H04W 8/005* (2013.01); *H04L 41/12* (2013.01); *H04L 63/0876* (2013.01)

(58) Field of Classification Search
CPC .... H04L 63/0876; H04L 41/12; H04W 8/005
USPC .......... 709/200–203, 217–227, 228; 370/252, 370/254, 312
See application file for complete search history.

(56) References Cited

U.S. PATENT DOCUMENTS

| | | | |
|---|---|---|---|
| 6,230,231 | B1 | 5/2001 | DeLong et al. |
| 7,831,692 | B2* | 11/2010 | French et al. ............... 709/220 |
| 8,284,782 | B1* | 10/2012 | Maufer et al. ........... 370/395.54 |
| 8,284,783 | B1* | 10/2012 | Maufer et al. ........... 370/395.54 |
| 2002/0073249 | A1* | 6/2002 | French et al. .................. 710/8 |
| 2003/0131082 | A1* | 7/2003 | Kachi ........................... 709/220 |

(Continued)

FOREIGN PATENT DOCUMENTS

| | | |
|---|---|---|
| EP | 2244525 A2 | 10/2010 |
| WO | 2014/055166 A1 | 4/2014 |
| WO | 2014/137382 A1 | 9/2014 |

OTHER PUBLICATIONS

International Search Report and Written Opinion for PCT/US2013/056129 dated Nov. 29, 2013.

(Continued)

*Primary Examiner* — Moustafa M Meky
(74) *Attorney, Agent, or Firm* — Nixon Peabody LLP

(57) ABSTRACT

Pairing among computing devices is achieved without any of the device entering discoverable mode. An inquiring device obtains a list of MAC addresses and transmits connection requests using the MAC addresses. Any device within reception distance that has the same MAC address would respond to the request. Upon receiving the response, the two devices would pair up. A beacon may be used to store MAC addresses and related data. Computing devices may send inquiries to the beacon and receive in return MAC addresses corresponding to the inquiry. The devices may then transmit pairing requests using these MAC addresses.

21 Claims, 2 Drawing Sheets

(56) References Cited

U.S. PATENT DOCUMENTS

| | | |
|---|---|---|
| 2005/0080884 A1 | 4/2005 | Siorpaes et al. |
| 2005/0250507 A1 | 11/2005 | Leung et al. |
| 2006/0072151 A1 | 4/2006 | Amani et al. |
| 2006/0253735 A1 | 11/2006 | Kwak et al. |
| 2007/0242637 A1 | 10/2007 | Dynarski et al. |
| 2008/0165701 A1 | 7/2008 | Ananthanarayanan et al. |
| 2009/0117949 A1 | 5/2009 | Allen, Jr. et al. |
| 2009/0275367 A1 | 11/2009 | Reinisch et al. |
| 2010/0015919 A1* | 1/2010 | Tian ............ 455/41.2 |
| 2011/0051642 A1 | 3/2011 | Krishnaswamy |
| 2012/0021760 A1 | 1/2012 | Strohbach et al. |
| 2012/0188980 A1 | 7/2012 | Wang et al. |
| 2012/0198081 A1 | 8/2012 | Zhao et al. |
| 2012/0210000 A1* | 8/2012 | Wood ............ 709/225 |
| 2013/0044640 A1* | 2/2013 | Yen et al. ............ 370/255 |
| 2013/0045710 A1 | 2/2013 | Raleigh |
| 2014/0087761 A1* | 3/2014 | Baskin et al. ............ 455/456.3 |
| 2014/0250204 A1 | 9/2014 | Shalunov et al. |

OTHER PUBLICATIONS

International Search Report and Written Opinion for PCT/US2013/056123 dated May 2, 2014.

Invitation to Pay Additional Fees for PCT/US2013/056123 dated Feb. 6, 2014.

International Search Report and Written Opinion for PCT/US2014/058917 dated Feb. 24, 2015.

* cited by examiner

DISCOVERING AND CONNECTING WIRELESS DEVICES WITHOUT DISCOVERABILITY

RELATED APPLICATIONS

This application relates to and claims priority from U.S. Provisional Application, Ser. No. 61/544,231, filed on Oct. 6, 2011, the disclosure of which is incorporated herein by reference in its entirety.

BACKGROUND

1. Field

This disclosure relates to wireless connectivity, especially to establishing connectivity without placing either device in discoverability mode.

2. Related Arts

Various wireless technologies enable inter-connectivity among two or more devices. Such technologies include NFC, WiFi Direct, Bluetooth, etc. Near Field Communication (NFC) is a set of standards for smartphones and similar devices to establish radio communication with each other by touching them together or bringing them into close proximity, usually no more than a few centimeters. Wi-Fi Direct is a standard that allows WiFi devices to connect to each other directly without the need for a wireless access point. The Bluetooth wireless technology standard enables devices to communicate seamlessly when situated in close proximity. What these technologies have in common is the ability of two devices to connect to each other directly using the proper protocol. The protocols generally follow three steps to establish a connection: inquiring device sends a request to target device, target device answers with proper information, inquiring device attempts to connect using the received information.

The following provides a more specific discussion relating to Bluetooth, but as can be appreciated, the discussions provided herein are applicable to other wireless connectivity protocols and technologies. Bluetooth uses a radio technology called frequency-hopping spread spectrum, which chops up the data being sent and transmits chunks of it on up to 79 bands (1 MHz each; centered from 2402 to 2480 MHz) in the range 2,400-2,483.5 MHz (allowing for guard bands). This range is in the globally unlicensed Industrial, Scientific and Medical (ISM) 2.4 GHz short-range radio frequency band. It usually performs 800 hops per second, with AFH enabled.

Bluetooth is a packet-based protocol with a master-slave structure. One master may communicate with up to 7 slaves in a piconet (an ad-hoc computer network using Bluetooth technology), wherein all of the connected devices share the master's clock. Packet exchange is based on the basic clock, which ticks at 312.5 µs intervals. Two clock ticks make up a slot of 625 µs and two slots make up a slot pair of 1250 µs. In the simple case of single-slot packets the master transmits in even slots and receives in odd slots, while the slave receives in even slots and transmits in odd slots. Packets may be 1, 3 or 5 slots long, but in all cases the master transmission will begin in even slots and the slave in odd slots.

The devices connected in a piconet can switch roles, by agreement, and the slave can become the master (for example, a headset initiating a connection to a phone will necessarily begin as master, as initiator of the connection; but may subsequently prefer to be slave). The Bluetooth Core Specification provides for the connection of two or more piconets to form a scatternet, in which certain devices simultaneously play the master role in one piconet and the slave role in another.

To use Bluetooth wireless technology, a device has to be able to interpret certain Bluetooth profiles, which are definitions of possible applications and specify general behaviors that Bluetooth enabled devices use to communicate with other Bluetooth devices. This is also applicable to the other pairing technologies, such as the NFC and WiFi Direct. These profiles include settings to parametrize and to control the communication from start. In order to establish a connection, a Bluetooth device has to operate in a discovery mode. Any Bluetooth device in discoverable mode will transmit the following information on demand: device name, device class, list of services, and technical information (for example: device features, manufacturer, Bluetooth specification used, clock offset). Any device may perform an inquiry to find other devices to connect to, and any device can be configured to respond to such inquiries. However, in general, establishing pairing between two devices requires user intervention. For example, the user needs to place at least one of the devices in discoverable mode and may also be required to enter a security code. With the proliferation of Bluetooth enabled devices, it is many times difficult for users to figure out how to place a device in discovery mode and how to enter the security code.

Tethering is an even more user unfriendly connection procedure and requires significant user involvement and knowledge, such that it generally remains within the realm of a "geek feature," utilized mainly by tech savvy users. Tethering is mostly used to connect a computer to a cellphone in order to gain access to the Internet, when WiFi or other Internet connection is not available. In addition to requiring user involvement in establishing tethering, various carriers and phone manufacturers place barriers to tethering, leading to various by-pass "creativity," such as rooting Android devices or jailbreaking iOS devices and installing a tethering application on the device.

In view of the above, a need exists for simplified inter-device connectivity, requiring minimal or no user intervention and/or input. Also, there is clear demand to enabling the use of a phone as an Internet gateway when no direct connection is available. Such a connection should be made available to the most novices of cellphone users, such that it can be widely used.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Various disclosed embodiments provide methods for establishing inter-device connection with minimal or no user intervention and/or input. There is a variety of reasons why it may be desirable to connect devices, using e.g., Bluetooth, when both of the devices are in non-discoverable mode. On many occasions it would be inconvenient to turn on discoverability mode. For example, many modern smartphones (such as those running iOS and Android) require human intervention to turn on discoverable mode. When discoverable mode is turned on with human intervention, the device only remains discoverable a limited time (a few minutes). However, not all applications can work well with the need to have human intervention to make the device discoverable: background applications can't do it at all, and for other applications, the interruption in the flow of user interface may be undesirable. Avoiding placing the device in a discoverable mode also enhance the privacy of the device, by not opening a window of opportunity for third parties to observe the devices on Bluetooth level while they are discoverable. The system's security is also enhanced by not opening a window of opportunity for an attacker to connect to devices in the system while they are discoverable.

Embodiments of the invention utilize the MAC address to initiate pairing. MAC address (Media Access Control) is a unique identifier assigned to network interfaces for communications on the physical network segment. MAC addresses are usually assigned by the manufacturer and are stored in the device's memory. For example, Bluetooth utilizes the MAC-48 identifier format. In various embodiments disclosed herein, the MAC address of the target device is used by the initiating device to initiate the pairing, bypassing the first two steps or discovery and data gathering. In such a situation, neither device needs to be in a discoverable mode.

The MAC address may be obtained in various ways. For example, it can be passed from one device to another using out of band communication, e.g., mobile data connection (e.g., 4G or 3G), using WiFi, or using other Bluetooth connections that the devices may have already established.

According to some embodiments, the system includes one or more beacons. The purpose of the beacon is to store information about known devices in the system and distribute it to other devices that need to connect. The beacon can be interrogated by devices to provide listing of MAC addresses according to any desired criteria. The system can also be used with devices that are in discoverable mode to speed up the connection step.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

The following provides examples of methods and systems for establishing inter-device connection (pairing) without having assuming discoverable mode or involving user actions. The various embodiments are applicable to technologies such as, for example, NFC, WiFi Direct, Bluetooth, etc. For ease of understanding, some of the embodiments are described with reference to a particular technology or protocol, but it should be understood that the same can be applied to other wireless connectivity technologies or protocols.

Figure 1:
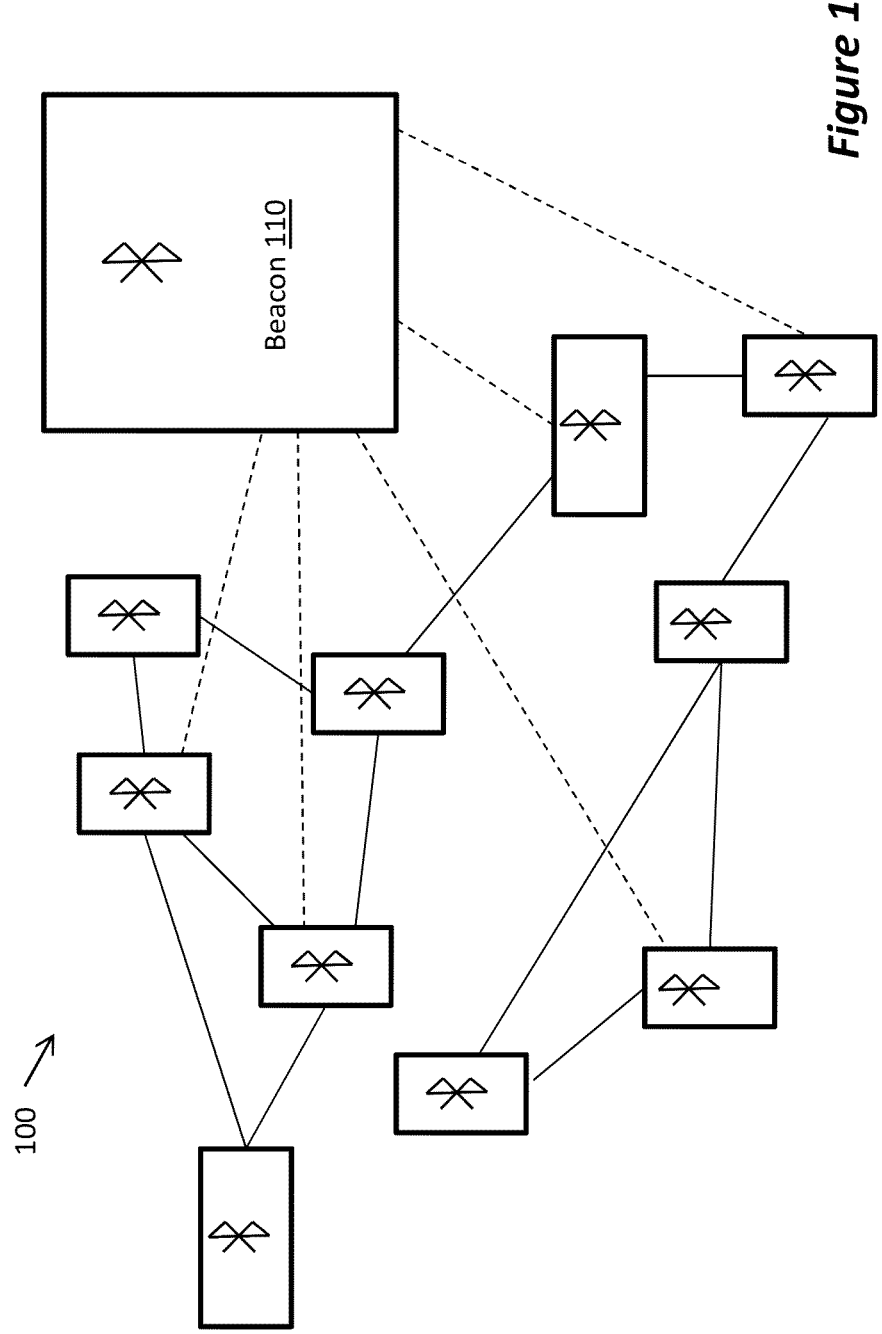
FIG. 1 is a schematic diagram illustrating a network of connected Bluetooth devices, according to an embodiment of the invention.

FIG. 1 illustrates a system 100 wherein various devices are connected (paired), and in which a beacon 110 may be used. For illustration purposes, the devices are shown as employing the Bluetooth protocol. The purpose of the beacon is to store information about known devices in the system and distribute it to other devices that need to connect. The solid lines signify connection among devices, e.g., Bluetooth pairing, while dashed lines signify logical connection to beacon 110. The logical connection to the beacon 110 can take various forms, for example, it could be TCP connections over a packet-switched network, broadcasts over a wireless network, or any other way to pass data between the individual devices and the beacon 100. The beacon 110 may be connected to all devices, but this isn't necessary for the system to operate. Indeed, the system can operate without a beacon 110 at all, as long as the MAC addresses are passed from one device to another via some means. Some or all of the devices may have one or more connections to one or more devices. Devices that do not have a beacon connection may join the network if they have memory of MAC addresses from previous associations, or if another device has memory of their MAC address, or if the beacon has memory of their MAC address.

The embodiment of FIG. 1 incorporates a beacon 110. Beacon 110 may be an actual physical device, e.g., one or more servers connected to the Internet, or may be implemented conceptually by, e.g., a listing agent distributed among various devices having MAC addresses tables. The individual devices may find and communicate with beacon 110 using one of the following examples. If the beacon is implemented as a server, it may have an assigned well-known DNS name, i.e., a DNS name known to all the devices that use the system. Similarly, a well-known IP address can be used. When the beacon is implemented conceptually, a distributed hash table may be utilized, where MAC addresses may be stored, or, alternatively, the DNS name or the IP of the beacon 110 can be stored. A device could also learn about the beacon from another device that is a part of the system. A combination of these methods can be used in the same system, e.g., a device can learn about the distributed hash table from another device and then use the distributed hash table to look up the DNS name of the beacon. Or the device can learn about the beacon 110 through another method commonly used to find services, such as information regularly broadcast on the network or transmitted to the device when it connects to the network or to the system of FIG. 1. The function of the beacon is the transmission of information between devices that may not have a direct connection between each other. The devices comprising the system use the beacon to automatically establish direct connections between each other.

In the system of FIG. 1, the devices periodically communicate with the beacon 110 and provide it with their MAC address and other related data. The beacon stores this information in its memory. When a devices needs to connect to another device, it request its MAC address from the beacon 110. The request may take place in various forms, depending on the situation of the devices. For example, a request may ask for MAC addresses of all devices related to a certain account (e.g., email account, Facebook® account, etc.). This would enable connectivity among all devices owned by the individual holding that account. So if, for example, the user owns a laptop, a pad, and a smart phone and uses these to access a certain account, these devices will be related to the account and the MAC addresses of these devices can be used to directly interconnect these devices.

According to another example, the geo-location of the requesting device can be used to send all MAC addresses of devices in close proximity to that geo-location. In this manner, the inquiring device could attempt to connect to all devices within its location. For example, the list may be cut off at a certain given distance, say 20 meters, from the geo-location of the requesting device. Also, when the list of MAC addresses is sent to the device, it can be ranked according to, e.g., their distance from the geo-location, so that the requesting device can start its connection attempts from the MAC address of the closest device.

There are practically infinite quarries that can be sent to the beacon to obtain MAC addresses. For example, the inquiry may be related to an access group, e.g., MAC addresses of devices made by a certain manufacturer, MAC addresses of devices running a certain operating system, MAC addresses of certain device type, MAC addresses of devices that were previously connected to device having MAC address XYZ, MAC address of all devices of my Facebook® friends, etc. Also, if ranking is used, it can be implemented according to many criteria, or according to a criterion requested by the inquiring device.

Having obtained the MAC addresses of potential neighboring devices from the beacon, the device initiates the connection, using the MAC to connect without having the receiving device entering a limited or general discoverable mode. That is, the initiating device transmits a request to the target device using the target devices' MAC address. The target device that receives a request with its MAC address would respond to the request, even if it is not in a discoverable mode. That is, the connection is performed by by-passing the two initial steps dictated by the protocol (e.g., Bluetooth protocol), but instead jumping directly to the third and last connection step.

It should be appreciated that the list of MAC addresses may contain addresses of devices that are not within communication distance to the requesting device. For example, for a Bluetooth device, devices that are more than twenty meters away from the requesting device are not good candidates for pairing. Depending on the query and the updating of the list at the beacon, the list of MAC addresses returned may include devices that are not available for communication, e.g., they have since moved to a different location, have been turned off, etc. However, this does not detract from the effectiveness of this embodiment. Rather, the receiving device simply cycles through the list and attempts to connect using the list of MAC addresses until the device receives a response from one of the devices nearby. Then it connects to that device. Therefore, it may be beneficial to include a ranking when providing the list of MAC addresses to a requesting device. The requesting device then can start the cycling from the highest ranking MAC address.

Figure 2:
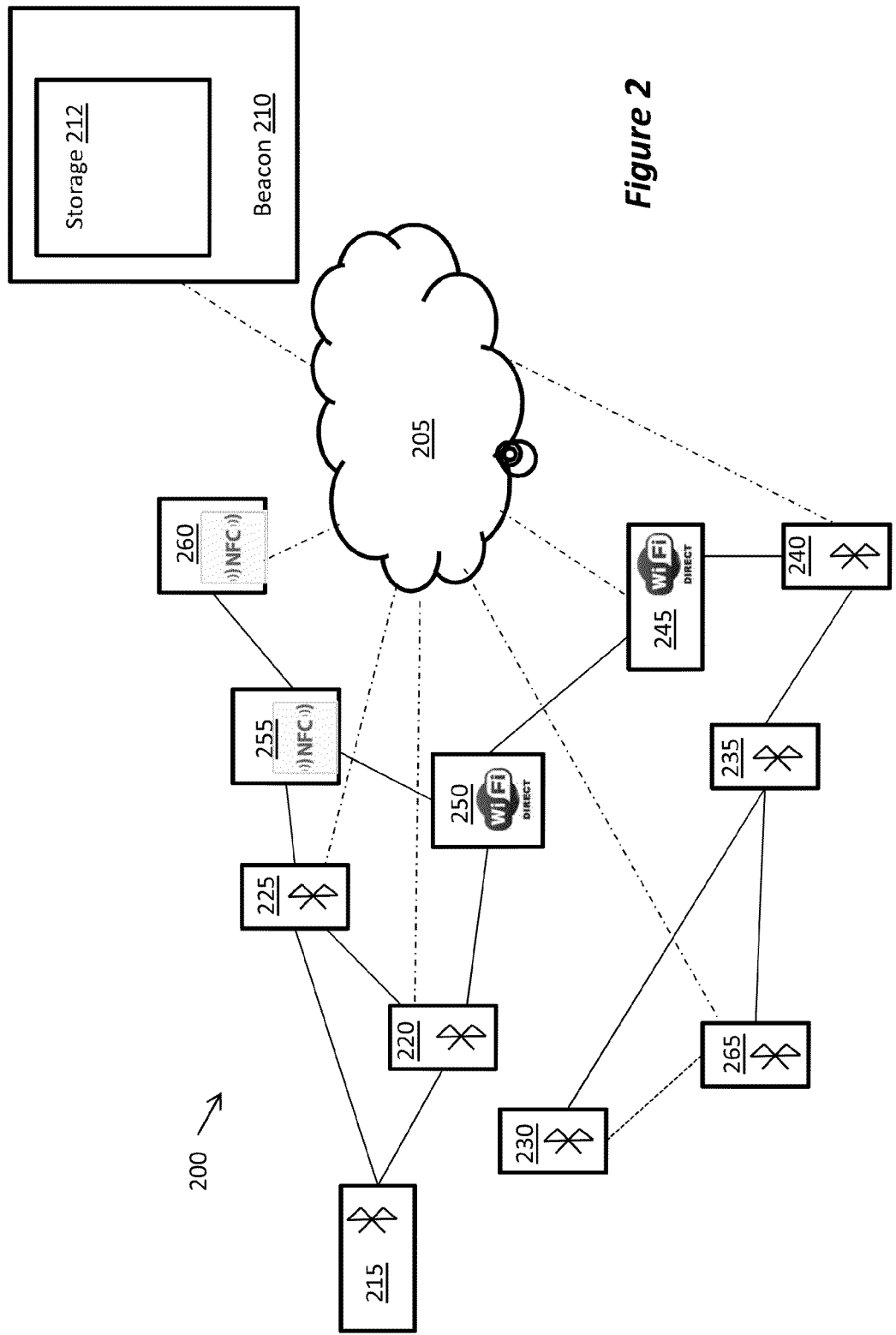
FIG. 2 is a schematic diagram illustrating a network of connected Bluetooth devices, according to another embodiment of the invention.

FIG. 2 illustrates another embodiment, wherein beacon 210 is one or more servers connected to the Internet 205, as illustrated by the dotted-dashed line. The beacon includes storage facility 212, which stores MAC addresses and related data, such as last known geo-location, device name and/or type, brand etc., account name (e.g., email account, phone number, Facebook account, etc.). Other devices, e.g., Bluetooth devices 220 and 225, WiFi Direct device 245, and NFC device 260, are also connected to the Internet 205 via various communication channels, e.g., 4G, 3G, WiFi, etc. All connections to the Internet are illustrated by the dotted-dashed lines. Inter-device connections are illustrated by solid lines. While the embodiment relates to various pairing protocols, it should be appreciated that a single inter-device pairings uses a single protocol, and for clarity only one is illustrated on each device in FIG. 2. Thus, for example, the pairing between Bluetooth device 225 and NFC device 255 is done using the Bluetooth protocol, although only the NFC symbol is illustrated on device 255. It should be understood that device 255 is capable of pairing and communicating using at least Bluetooth and NFC protocols. Similarly, devices 245 and 250 are capable of pairing and communicating using at least Bluetooth and WiFi Direct protocols.

As illustrated in FIG. 2, Bluetooth device 215 has no direct connection to the Internet. However, device 215 has Bluetooth connections to devices 220 and 225. Thus, device 215 may access the Internet via its Bluetooth connection to either or both devices 220 and 225. This is a rather beneficial feature of this embodiment. That is, assuming that device 220 has a WiFi connection to the Internet, and device 225 has a 4G connection to the Internet. Using its Bluetooth connection, device 215 may access the Internet using either device 220's WiFi connection or device 225's 4G connection. Device 215 may also hop between these connections depending on speed and reliability of either connection. Also, device 215 may utilize both connections to provide increased speed.

FIG. 2 illustrates another feature, wherein a Bluetooth device can use a chain of pairing to connect to the Internet. As illustrated, device 230 has no direct connection to the Internet, but has direct Bluetooth connection to device 235 and indirect connection to 240 via device 235. Device 235 does not have Internet connection either, but device 240 does have Internet connection. Thus, device 230 may utilize the chain Bluetooth pairing to connect to the Internet using device 240's connection.

Another feature illustrated in FIG. 2 is the ability to find nearby devices without sending a query to the beacon 210. This is schematically illustrated by the dotted line between device 230 and 265. For the sake of illustration, assume that there is no connection between these two devices and that neither device is in discoverable mode. Since device 230 is connected to device 235, it can query device 235 for all MAC addresses that device 235 is aware of. Since device 235 is connected to device 265, the MAC address of device 265 will be included in the list returned from device 235. Once device 230 receives the list, it can attempt to communicate with devices on that list, which will include device 265, for which it now has the MAC address, so that it need not have device 265 in discoverable mode for pairing.

As can be appreciated, each device may save MAC addresses of all devices it was ever connected to or MAC addresses of any lists it ever receives. Thus, when it is interrogated by another device, it can send the entire list of MAC addresses stored within the device. In this manner, the MAC addresses of devices can be propagated within the devices in the system, thereby reducing or eliminating the reliance on, or the need for a beacon. On the other hand, the system may relate to the geo-location of each device and may send MAC addresses of only devices within communication range of the geo-location. Alternatively, it may send a list of all of the stored MAC addresses, but identify or rank those addresses that are within communication range to the geo-location.

Another feature illustrated in FIG. 2 is the ability to communicate using a standard or protocol that a device is not supporting. For example, NFC is becoming popular as a mobile payment mechanism. For example, Google Wallet allows consumers to store credit card and store loyalty card information in a virtual wallet in their NFC-enabled mobile devices, and then use an NFC-enabled pay terminals to pay wirelessly. However, many devices may not be NFC-enabled, but may be WiFi Direct or Bluetooth enables. Thus, for example, device 225 may be Bluetooth enabled, but not NFC enabled, or may be too far from an NFC terminal 260 to consummate a payment transaction. However, device 255 is paired with device 260 and with device 225 and can serve as a bridge between these two devices. That is, device 225 can perform the transaction by communicating with device 255 using the Bluetooth pairing, and device 255 would relay the communication to device 260 via its NFC pairing. The same can be done with any other combination of standards.

As explained above, the use of a physical beacon is only one possible embodiment, but the beacon may alternatively be implemented conceptually, e.g., as a distributed beacon. That is, the beacon simply acts as a sort of a listing agent, which stores MAC addresses and related data. When the listing agent receives a request for MAC addresses, it sends a response that corresponds to the requirement of the request.

For example, the MAC addresses may be stored in a distributed hash table, having entries for each device that may consist of, e.g., device MAC address, device model, and last known geo-location. The table may be implemented using simple chaining, as collisions are of no real consequence. For example, if a key leads to a double or multiple entries, all entries can be fetched and sent since, the receiving device may simply attempt to connect to all of them and the worst that can happen is that it will not be able to connect to some of the devices in the multiple entries, but may connect to others. Since cycling through the MAC addresses during attempt of pairing is rather fast, the user may not even know that some of the entries are not valid.

According to some embodiments, each devices periodically checks in with the beacon, whether it be a physical beacon or a distributed conceptual beacon. The periodic check may be set according to elapsed time, according to new event, etc. For example, each time the device receives new information, for example if it changed location, paired with a new device, etc., it may check in with the beacon and provide the new information. The beacon stores this new information and may update the geo-location and reporting time of the reporting device. The timing and geo-location may be used by the beacon when it applies ranking or probability to each MAC address it provides to requesting devices.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

The invention claimed is:

1. A process embodied in a processor readable code that, when executed causes a computing device to perform the steps comprising:
   a. obtaining at least one MAC address of at least one target device;
   b. causing the computing device to wirelessly transmit a connection request that includes a first MAC address a target device;
   c. if a response is received from the target device, causing the computing device to establish wireless pairing with the target device that sent the response, without entering a discoverable mode; and, d. if no response is received, causing the computing device to either terminate the process or wirelessly transmit another connection request that includes another MAC address of a target device and then revert to step c.

2. The process of claim 1, wherein the another MAC address is different from the first MAC address and is changed each time step d is repeated.

3. The process of claim 1, wherein the another MAC address is the same as the first MAC address.

4. The process of claim 1, wherein the step of obtaining at least one MAC address comprises causing the computing device to transmit a request for MAC addresses to a listing agent.

5. The process of claim 1, wherein the request includes geo-location information of the computing device.

6. The process of claim 5, wherein the connection request proceeds according to probability ranking of MAC addresses.

7. The process of claim 6, wherein the probability ranking is determined relative to the geo-location information.

8. The process of claim 1, wherein the step of obtaining at least one MAC address comprises causing the computing device to transmit a request for MAC addresses to a paired device with which the computing device has already established pairing.

9. The process of claim 1, wherein the step of obtaining at least one MAC address comprises causing the computing device to fetch a MAC address from a storage facility of the computing device.

10. The process of claim 1, wherein the step of obtaining at least one MAC address comprises causing the computing device to transmit a request for MAC addresses to a beacon.

11. The process of claim 1, wherein the beacon comprises at least one server having storage facility for storing MAC addresses and related data.

12. The process of claim 1, wherein the beacon comprises a distributed table stored in plurality of computing devices.

13. A process embodied in a processor readable code that, when executed causes a computing device to perform the steps comprising:
   establishing communication channels with a plurality of mobile computing devices;
   obtaining from each mobile computing device its MAC address and related data;
   storing the MAC address and related data in a storage facility; and,
   upon receiving a request from one of the mobile computing devices, responding to the request by transmitting at least one MAC address of a different mobile computing device from the storage facility.

14. The process of claim 13, further comprising, upon receiving the request, determining a geo-location of a requesting device and searching the storage for MAC addresses of computing devices in close proximity to the geo-location.

15. The process of claim 14, wherein the distributed table comprises a distributed hash table.

16. The process of claim 13, wherein the step of responding comprises transmitting a ranked list of MAC addresses.

17. The process of claim 13, wherein the related data comprises geo-location, and further comprising periodically receiving geo-location updates from the computing devices and storing the updates in the storage facility.

18. The process of claim 13, wherein the step of storing the MAC address comprises compiling a distributed table and wherein the storage facility comprises memory devices residing in the plurality of computing devices.

19. A system for enabling wireless pairing of computing devices, comprising:

a storage facility for storing MAC addresses of the computing devices;

a processing facility programmed to receive inquiries from one of the computing devices and respond to the computing device by transmitting lists of MAC addresses relating to other computing devices which are in geographic close proximity to the computing device sending the inquiry;

said processing facility further obtaining updates and storing the updates in the storage facility.

20. The system of claim 19, wherein the storage facility and the processing facility comprises at least one server coupled to a communication network.

21. The system of claim 19, wherein the storage facility and the processing facility is distributed among the computing devices.

\* \* \* \* \*